(12) United States Patent
Lindsay

(10) Patent No.: US 6,416,024 B1
(45) Date of Patent: Jul. 9, 2002

(54) TILTABLE MOUNTINGS FOR TV CAMERAS

(75) Inventor: Richard Arthur Lindsay, Gislingham (GB)

(73) Assignee: Vitec Group, PLC (GB)

( * ) Notice: Subject to any disclaimer, the term of this patent is extended or adjusted under 35 U.S.C. 154(b) by 0 days.

(21) Appl. No.: 09/647,195

(22) PCT Filed: Mar. 29, 1999

(86) PCT No.: PCT/GB99/00982
§ 371 (c)(1),
(2), (4) Date: Nov. 30, 2000

(87) PCT Pub. No.: WO99/50588
PCT Pub. Date: Oct. 7, 1999

(30) Foreign Application Priority Data

Mar. 27, 1998 (GB) .............................................. 9806670

(51) Int. Cl.⁷ ............................................... F16M 11/12
(52) U.S. Cl. ..................... 248/183.2; 248/133; 248/371; 396/421
(58) Field of Search ............................... 248/183.2, 371, 248/372.1, 187.1, 133; 396/421, 428

(56) References Cited

U.S. PATENT DOCUMENTS

| | | | | |
|---|---|---|---|---|
| 3,545,710 A | * | 12/1970 | Mooney | 248/183.2 X |
| 3,970,274 A | * | 7/1976 | Resk | 248/371 X |
| 4,010,923 A | * | 3/1977 | Miller et al. | 248/183.2 |
| 4,354,654 A | * | 10/1982 | Werner et al. | 248/663 |

FOREIGN PATENT DOCUMENTS

| | | | |
|---|---|---|---|
| FR | 2552 578 A1 | * | 3/1985 |
| GB | 2189042 A | * | 10/1987 |

* cited by examiner

Primary Examiner—Ramon O. Ramirez
(74) Attorney, Agent, or Firm—Moser, Patterson & Sheridan, L.L.P.

(57) ABSTRACT

The disclosure relates to a tiltable mounting for a TV camera or the like comprising a base (11), a camera support (16) mounted on the base to tilt about a first horizontal axis to either side of a neutral, upright position, and a counterbalancing mechanism (12) for holding the support with a payload upright or in any rotational position to which it is moved from said upright position. The counterbalancing mechanism comprising an elongate guideway (29) having one end coupled to the support at an eccentric location (23) to said first horizontal axis. A guide (27) with which the guideway (29) is slidably engaged is pivotally mounted on the base about a further horizontal axis spaced from said first axis such that tilting movement of the mounting about the first axis from the neutral position causes the guideway to slide with respect to the guide. Preloaded springs act between the guide (27) and a stop (34) on the guideway to resist movement of the guideway with respect to the guide with tilting of the support from the neutral position and to provide said counterbalancing force. A mounting (25) for the guide (27) provides adjustment along a line intersecting said first and further axes for moving the guide along the guideway and thereby adjusting the preload of said spring means, wherein the guide is mounted for linear movement by a spaced pair of links pivotally connected to the guide and to the base at respective spaced locations.

9 Claims, 4 Drawing Sheets

TILTABLE MOUNTINGS FOR TV CAMERAS

This invention relates to tiltable mountings for TV cameras or the like including cinematograph and video cameras.

Such mountings should tilt smoothly and easily and should be counterbalanced so that they remain static without additional support wherever they are placed in the range of tilt angle provided. The counterbalance mechanisms must be readily adjustable to cater for cameras of different weights and which have centres of gravity at different heights above the support.

UK Patent Specification No. 2189042 discloses such a tiltable mounting comprising a base, a support member for supporting an article thereon, the support member being tiltable about an axis on the base for tilting about each side of a neutral position in which the center of gravity is above the axis, guides mounted at a pivot on the support member which is offset relative to the axis, guideways pivotally mounted on the base and slidable in the guides, the guideways intersecting the axis when the support member is at the neutral position, and spring means located on the guideways such that upon tilting of the support member from its neutral position, the spring means is deflected and produces a reaction on the support member which is equal to the out of balance moment of the tilted center of gravity. To cater for cameras of different weights and with centres of gravity at different locations above the support, the guides have adjusting means mounted on the base to preload said spring means in relation to the weight and position of the centre of gravity of the article.

This invention provides a tiltable mounting for a TV camera or the like comprising a base, a camera support mounted on the base to tilt about a first horizontal axis to either side of a neutral, upright position, and a counterbalancing mechanism for holding the support with a payload upright or in any rotational position to which it is moved from said upright position, the counterbalancing mechanism comprising an elongate guideway having one end coupled to the support at an eccentric location to said first horizontal axis, a guide with which the guideway is slidably engaged pivotally mounted on the base about a further horizontal axis spaced from said first axis such that tilting movement of the mounting about the first axis from the neutral position causes the guideway to slide with respect to the guide, preloaded spring means acting between the guide and a stop on the guideway to resist movement of the guideway with respect to the guide with tilting of the support from the neutral position to provide said counterbalancing force and a mounting for the guide providing adjustment along a line intersecting said first and further axes for moving the guide along the guideway and thereby adjusting the preload of said spring means, wherein the guide is mounted for linear movement by a spaced pair of links pivotally connected to the guide and to the base at respective spaced locations.

Preferably said first and further axes are spaced horizontally and said guide is mounted on said links for movement along a horizontal line intersecting said first and further axes.

In either of the above arrangements the means for adjusting the guide linearly may comprise a shaft mounted for rotation on the base about an axis extending along said line passing through the first and further axes, the shaft having a screw threaded portion which engages in a screw threaded bore in a part of the guide so that rotation of the shaft adjusts the position of the guide.

More specifically the guide has a screw threaded socket in which the screw threaded portion of the shaft engages.

In any of the above arrangements the elongate guide may have a stop for said spring means at the end remote from the end eccentrically connected to the tiltable mounting and the spring means act between the stop and guide.

Also in any of the above arrangements two or more guideways may be connected side by side to the tiltable mounting and engage in two or more guides connected together to pivot about said further axis.

The following is a description of a specific embodiment of the invention, reference being made to the accompanying drawings in which.

Figure 1:
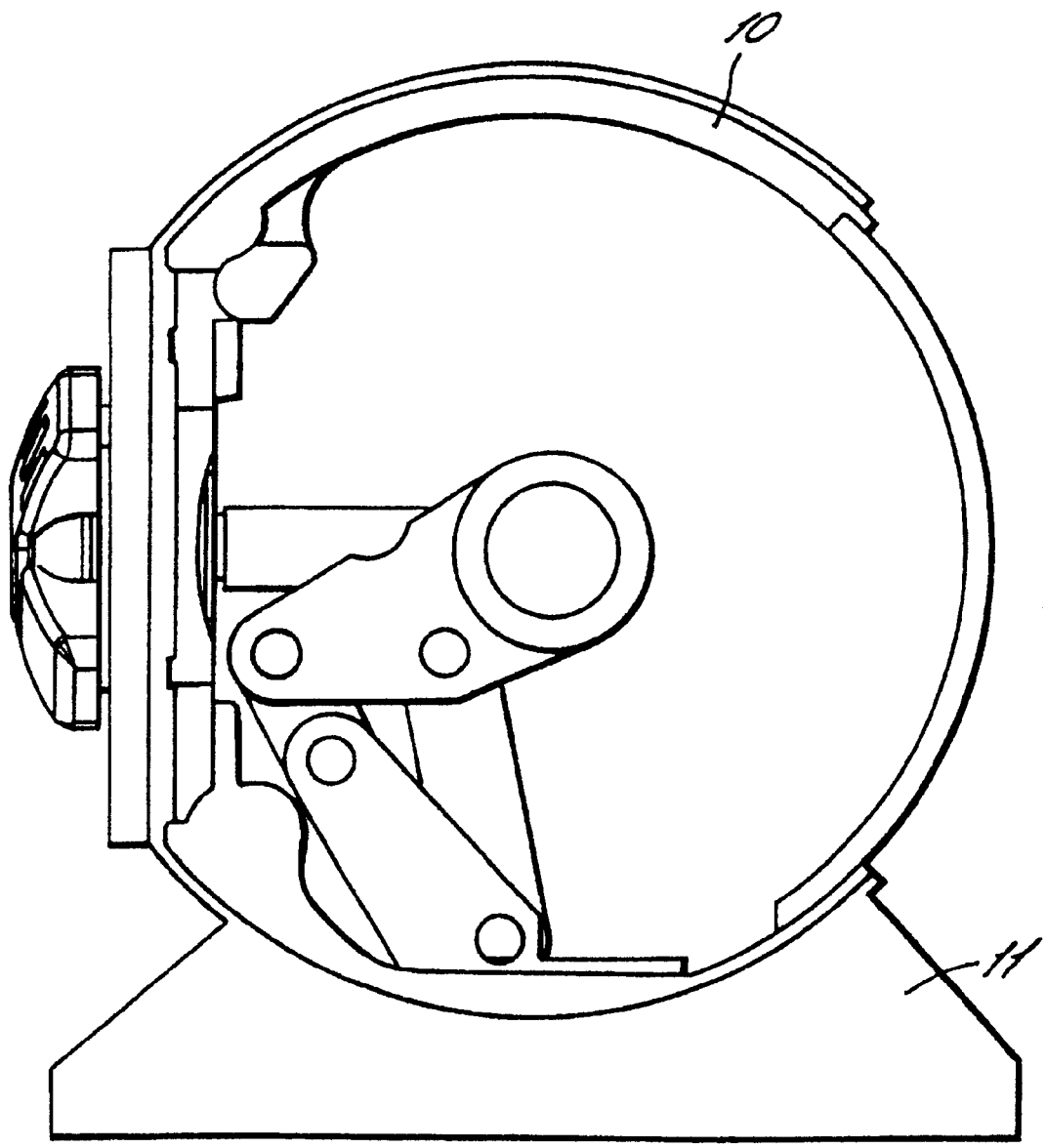
FIG. 1 is a side view, partly cut away, of a tiltable TV camera mounting including an adjustable counterbalancing mechanism.
Figure 2:
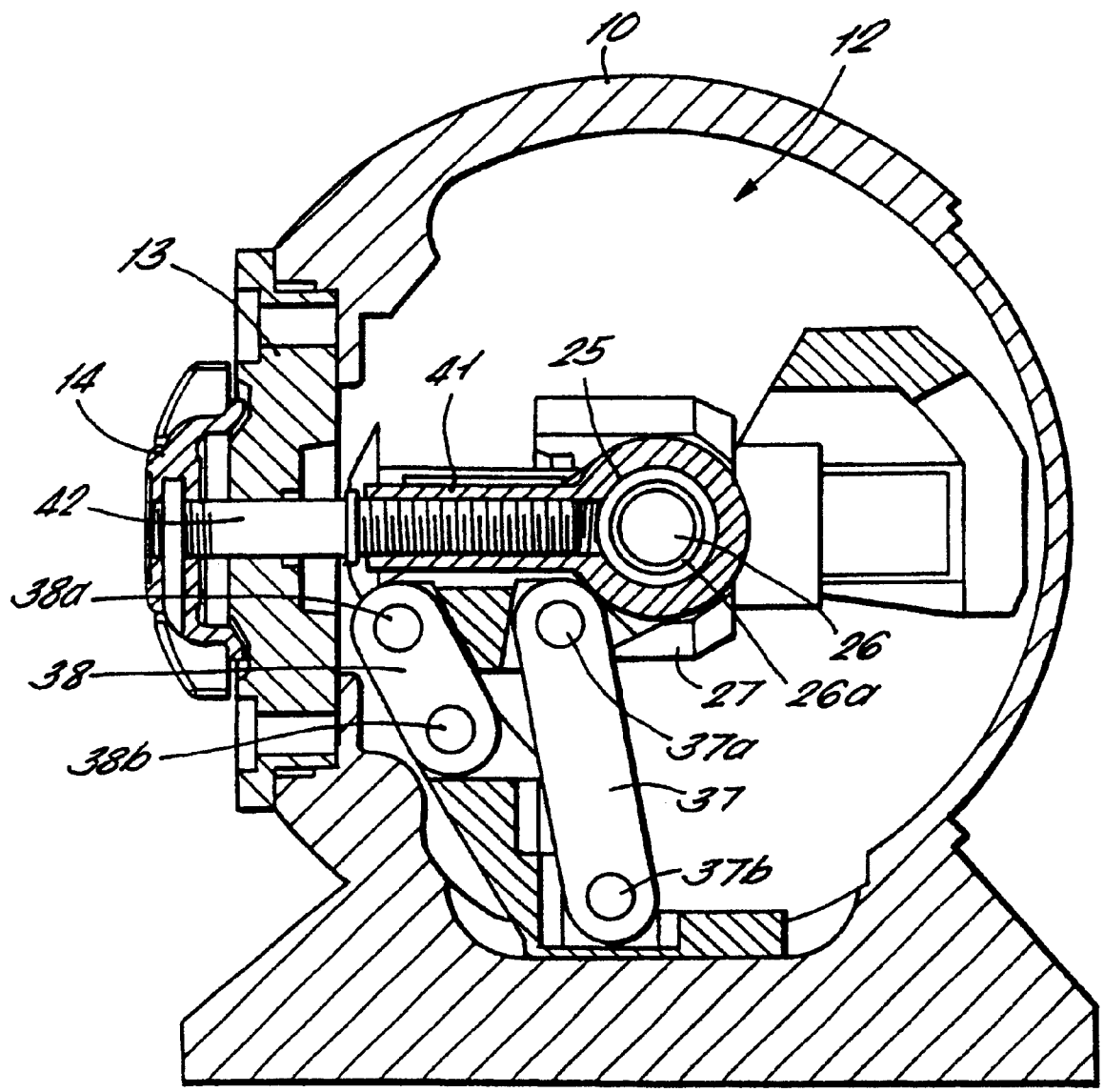
FIG. 2 is a cross sectional view through the mounting of FIG. 1.

Referring firstly to FIGS. 1 and 2 of the drawings, there is shown a tiltable mounting for a TV or cinematograph camera comprising a generally cylindrical housing 10 formed with an integral base portion 11 for mounting the housing on a camera pedestal or similar support. A counterbalance mechanism 12 to be described in detail later for controlling tilting of the camera support is enclosed in the housing 10. The housing has a vertical inset front wall 13 in which a control mechanism for adjusting the counterbalance is mounted including the control knob 14. Again, details of the adjustment mechanism will be described in detail later.

Figure 3:
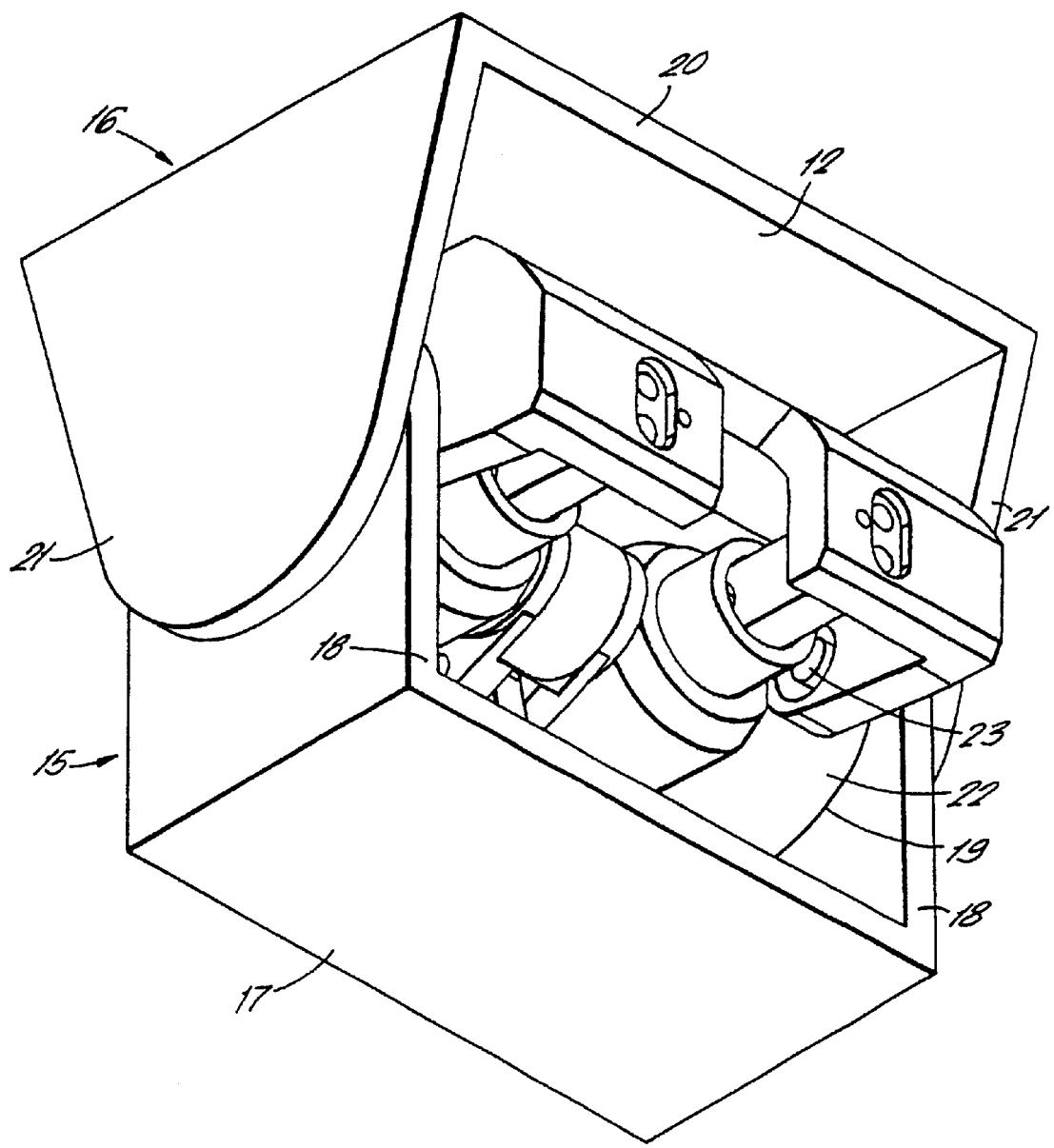
FIG. 3 is a detailed view of the camera support tiltably mounted on a base and illustrating part of the counterbalancing mechanism for the support provided.

Reference will now be made to FIG. 3 of the drawings in which the housing/base portion are shown diagrammatically indicated by the reference numeral 15 and a camera support is indicated generally at 16 tiltably mounted on the base about a horizontal axis. The base 15 comprises a base plate 17 having two upstanding side walls 18. Two large diameter concentric bores 19 are provided in the respective side walls 18. The camera support 16 comprises a top wall or platform 20 to receive the camera having downwardly extending side walls 21. Shallow cylindrical hubs 22 are located concentrically on the inside faces or the side walls 21 to engage and be rotatably supported in the bores 19 of the side walls of the base. The support is thus mounted for rotation about the aforesaid horizontal axis with respect to the base to tilt from either side of an upright, neutral position. Plain or roller bearings may be provided in the bores 19 to support the hubs 22 for rotation therein if required.

Figure 4:
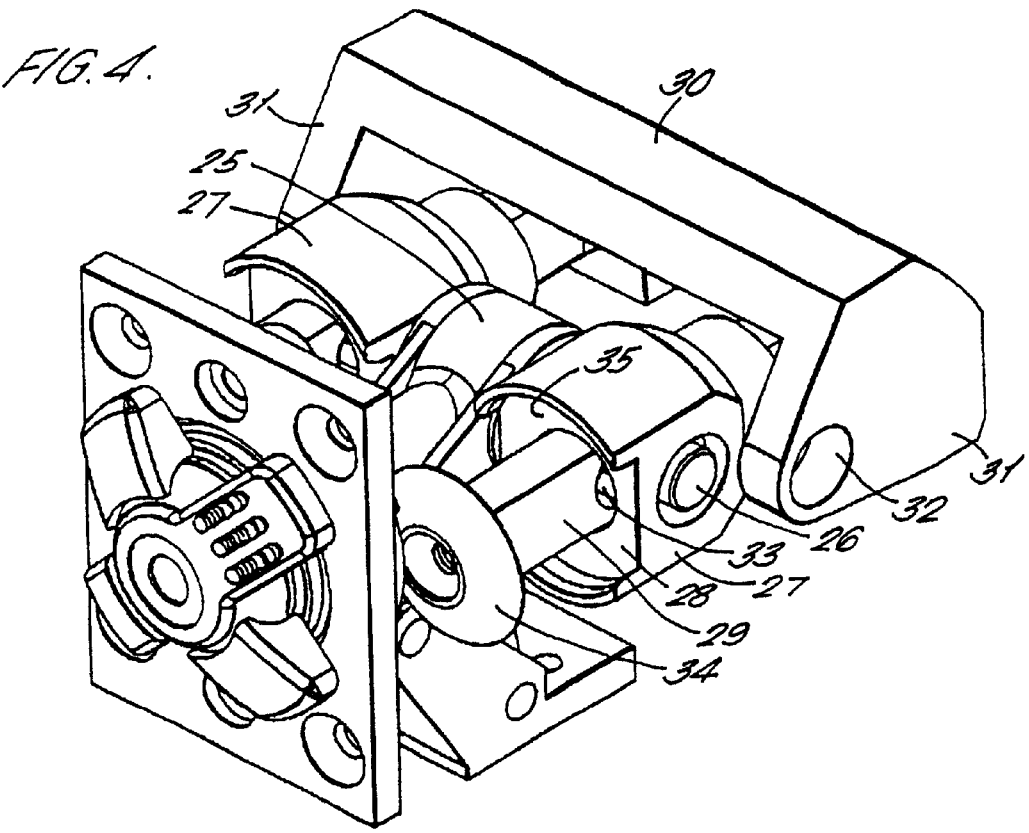
FIGS. 4 and 5 are perspective views showing the counterbalancing mechanism in greater detail.
Figure 5:
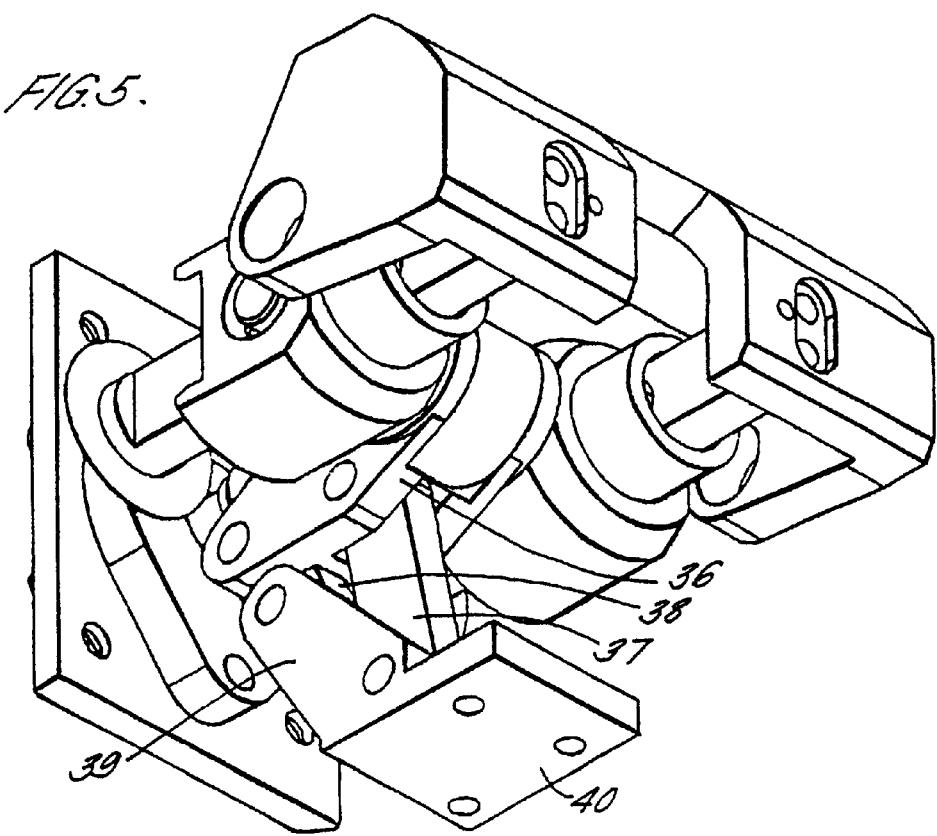

Each hub 22 has an inwardly projecting eccentric pin 23 mounted thereon to couple to the counterbalancing mechanism 12. The counterbalancing mechanism will now be described in greater detail with reference to FIGS. 4 and 5.

The counterbalancing mechanism comprising a carrier 25 in which a spindle 26 is rotatably mounted in a needle roller bearing 26a and projects on either side of the carrier. Guides 27 are pivotally supported on the spindle on either side of the carrier. The guides 27 have throughways 28 in which elongate generally rectangular section guideways 29 are mounted for linear sliding movement. The guideways 29 are connected at one end to a cross member 30 having side lugs 31 formed with concentric bores 32 in which said eccentric pivots 23 on the hubs 22 of the tiltable mounting engage.

The guideways 29 have elongate slots 33 through which the spindle 26 passes so that the members can move longitudinally through the guides 27. The axis of the spindle 26 is spaced horizontally from the axis about which the hubs of the tiltable camera support rotate so that as the support rotates, the bridging member 30 will rotate with it through the connection of the eccentric pivots 23 and the relative spacing of the spindle axis and hub axis 22 will cause the bridging member to draw the guideways 29 through the guides.

Spring cups 34 are mounted at the free ends of the guideways 29 and the opposing faces of the guides 27 are formed with spring sockets 35. Heavy compression springs are mounted between the spring cups and sockets 35 around the guideways to resist movement of the guideways with respect to the guides with tilting of the camera support to counterbalance the support.

The extent of the counterbalancing force is varied by adjusting the position of the carrier 25. To that end, the carrier is mounted in a frame 36 supported on long and short links 37, 38 respectively pivotally connected at spaced locations to the frame by pivot pins 37a, 38a. The shorter link 38 is pivotally connected by a pivot pin 38b to the upper ends of a pair of upstanding lugs 39 formed integrally with a base plate 40 secured by bolts to the bottom of the base portion 17 of the housing. The longer link 37 is pivotally connected by a pivot pin 37b to the lower ends of the lugs. The links 37, 38 support the frame 36 and thereby the hub 25 to move linearly along a line intersecting the aforesaid horizontal axes along the spindle 26 and hubs 22.

An elongate internally screw threaded sleeve 41 is formed integrally with the hub 25 as best seen in FIG. 2 of the drawing and a shaft 42 mounted in the front walls 13 of the housing has a screw threaded portion engaging in the sleeve. The end of the shaft projects from the front wall 13 of the housing and the aforesaid control knob 14 is secured to the end of the shaft for rotating the shaft and thereby adjusting the position of the hub 25 through the action of the screw threaded portion of the shaft in the sleeve 14. By moving the hub 25 forward and back, the guides 27 are moved forward and back along the guideways 29 thereby adjusting the degree of compression of the spring on the sideway to vary the preload to suit the weight of the camera and the centre of gravity of the camera above the platform 20.

In use, when the camera is tilted on the support 16 about the base 15, the hubs 22 are rotated causing the pivots 23 to swing the bridging member 30 upwardly or downwardly according to the direction of tilt from the neutral position. In tilting the bridging member 30, about the spindle 26, the guideways 29 are drawn through the guides 27 against the action of the compression springs on the guideways to provide a counterbalancing force to hold the tiltable support in the position away from the neutral position to which it has been moved. The geometry of the arrangement is such that once a suitable counterbalancing force has been set for one position away from the neutral, upright position, the correct counterbalancing force is automatically generated by the mechanism throughout the range of tilt movement provided by the support. When a camera of different weight or different centre of gravity above the platform is installed, the mechanism is readily adjusted using the control hub 14 to vary the pre-compression of the springs.

What is claimed is:

1. A tiltable mounting for a camera comprising: a base, a camera support mounted on the base tiltable about a first horizontal axis to either side of a neutral, upright position, and a counterbalancing mechanism for holding the support with a payload upright or in any rotational position to which it is moved from said upright position, the counterbalancing mechanism comprising an elongate guideway having one end coupled to the support at an eccentric location to said first horizontal axis, a guide with which the guideway is slidably engaged pivotally mounted on the base about a further horizontal axis spaced from said first axis such that tilting movement of the mounting about the first axis from the neutral position causes the guideway to slide with respect to the guide, preloaded spring means acting between the guide and a stop on the guideway to resist movement of the guideway with respect to the guide with tilting of the support from the neutral position to provide said counterbalancing force and a mounting for the guide providing adjustment along a line intersecting said first and further axes for moving the guide along the guideway and thereby adjusting the preload of said spring means, wherein the guide is mounted for linear movement by a spaced pair of links pivotally connected to the guide and to the base at respective spaced locations.

2. The tiltable mounting as claimed in claim 1, wherein said first and further axes are spaced horizontally and said guide is mounted on said links for movement along a horizontal line intersecting said first and further axes.

3. The tiltable mounting as claimed in claim 1, wherein the means for adjusting the guide linearly comprises a shaft mounted for rotation on the base about an axis extending along said line passing through the first and further axes, the shaft having a screw threaded portion which engages in a screw threaded bore in a part of the guide so that rotation of the shaft adjusts the position of the guide.

4. The tiltable mounting as claimed in claim 3, wherein the guide has a screw threaded socket in which the screw threaded portion of the shaft engages.

5. The tiltable mounting as claimed in claim 1, wherein the elongate guideway has a stop for said spring means at the end remote from the end eccentrically connected to the tiltable mounting and the spring means act between the stop and guide.

6. The tiltable mounting as claimed in claim 1, wherein two or more guideways are connected side by side to the tiltable mounting and engage in two or more guides connected together to pivot about said further axis.

7. The tiltable mounting as claimed in claim 1, further comprising a tiltable mounting for a video camera.

8. The tiltable mounting as claimed in claim 1, further comprising a tiltable mounting for a cinematograph camera.

9. The tiltable mounting as claimed in claim 1, further comprising a tiltable mounting for a television camera.

* * * * *